May 6, 1947.  E. R. SANDERS  2,420,055
TESTING DEVICE
Filed Dec. 31, 1943  2 Sheets-Sheet 1

INVENTOR
EDWIN R. SANDERS
BY
ATTORNEY

May 6, 1947.　　　　　E. R. SANDERS　　　　　2,420,055
TESTING DEVICE
Filed Dec. 31, 1943　　　2 Sheets-Sheet 2

INVENTOR
EDWIN R. SANDERS
BY
ATTORNEY

Patented May 6, 1947

2,420,055

UNITED STATES PATENT OFFICE 2,420,055

TESTING DEVICE

Edwin R. Sanders, Silver Spring, Md., assignor to the United States of America, as represented by the Secretary of the Navy Application December 31, 1943, Serial No. 516,483

5 Claims. (Cl. 173—324)

This invention relates generally to testing devices and more particularly to an improved tester for vacuum tubes, condensers and other electrical devices having loose-ended leads or connectors.

One of the principal objects of my invention, therefore, is to provide a testing device which is so constructed that proper contact between the leads of a vacuum tube, condenser or the like may be established without the use of spring jaws or other easily damaged contacts.

Another object of the invention resides in the provision of a testing device of this character wherein means is employed for guiding the leads of a vacuum tube into the proper position for testing so that said testing may be done with maximum speed and efficiency.

Still another object of this invention is to provide a testing device for vacuum tubes employing means for establishing quick and positive contact between the leads of the vacuum tube and the contacts employed by the testing equipment.

And another object of the invention is to provide a device of this character which may be mounted readily on a testing unit or in any other desired position.

Further objects of the invention, not mentioned hereinbefore, will be apparent from a reading of the following description:

Considered in its broadest aspects, the invention comprises a frame which includes side rails which are connected at their corresponding forward ends by a contact strip of insulating material. The strip carries contacts which are connected with an oscillator which may, as stated, be mounted beneath said board or in any other convenient position. Suitable guides are provided for assisting the operator in directing the leads of the vacuum tube to be tested to the proper contacts. Means is also provided to retain the leads in contact with the contacts during a testing operation. This means consists of a rod which has its opposite end portions journaled in the side rails, said rod being bent to define a crank and being provided with spring retaining fingers for clamping the said wires on said contacts.

The invention is illustrated in the drawings which form a part of this disclosure.

Figure 1:
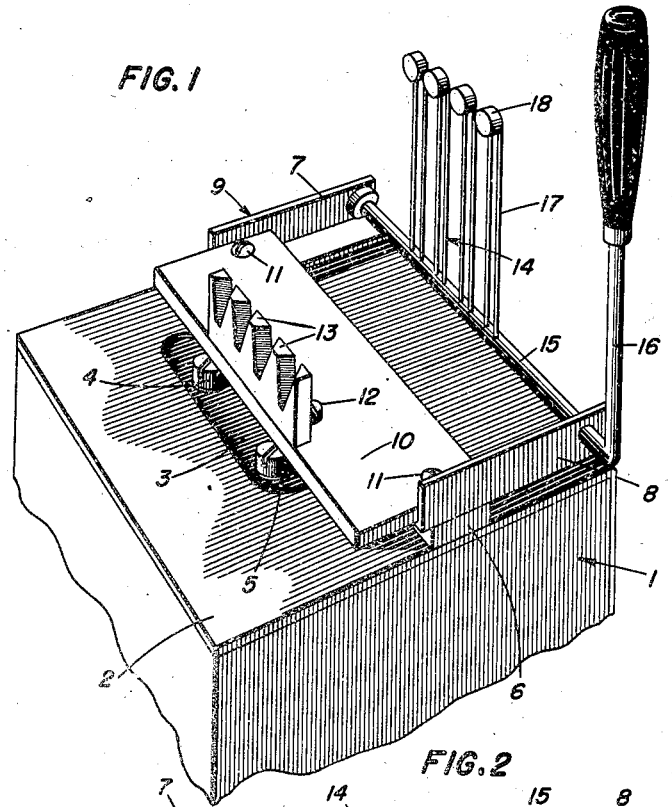
Figure 2:
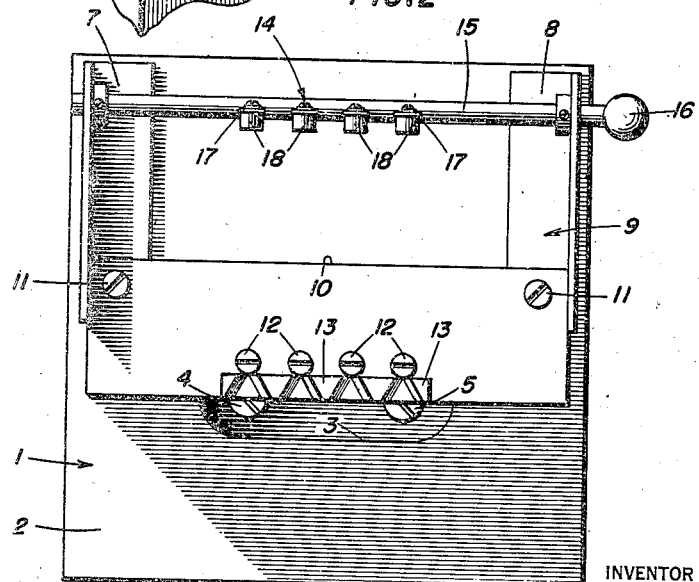
Figure 3:
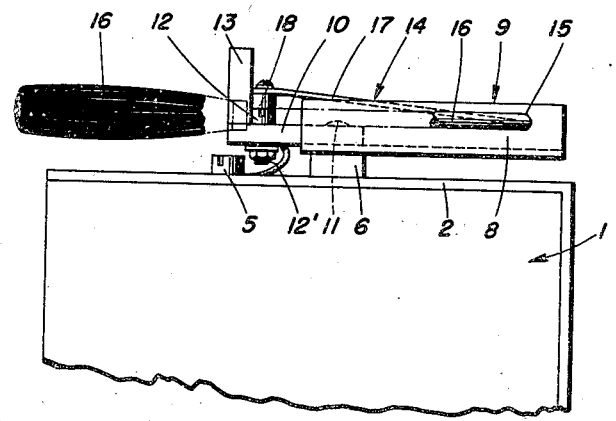
Figure 4:
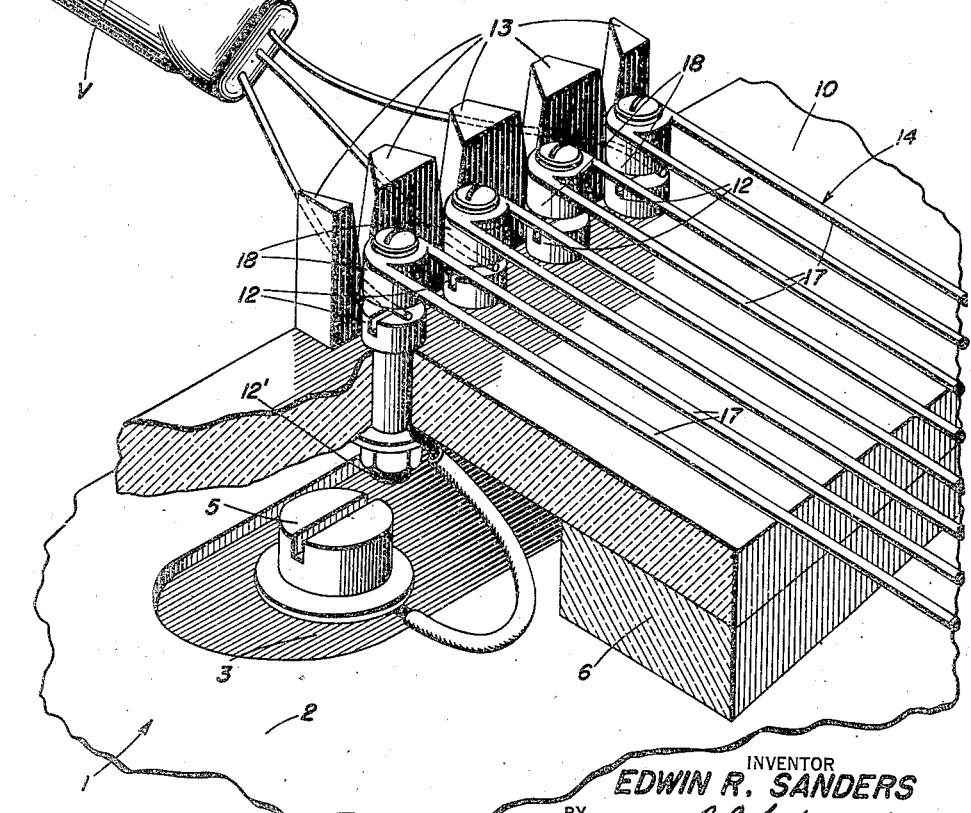

In said drawings:

Fig. 1 is a perspective view showing my improved testing device, the retaining fingers being shown in raised or inoperative position, Fig. 2 is a top plan view of the device with the retaining fingers in the same inoperative position, Fig. 3 is a vertical sectional view, partly in elevation, showing the device with the spring fingers in operative position for clamping the leads of the vacuum tube to the upper ends of the contacts, and Fig. 4 is an enlarged perspective view of a portion of the device with parts broken away, showing the contacts in operative position.

In the drawings, similar reference numerals will be used to designate like parts. The numeral 1 indicates generally a testing unit of any suitable design. The unit 1 may include an oscillator or other test circuit. The testing unit 1 includes a top wall 2 which is formed with a central opening 3, said opening exposing terminals 4 and 5. Spaced above the top wall 2, and at each side thereof by blocks 6, are the side rails 7 and 8 of a frame 9. As best seen in Fig. 1, the side rails are of substantially L shape. Extending between the corresponding forward ends of the rails 7 and 8 and overhanging the opening 3 is a contact strip 10, which is formed of a suitable insulating material and is secured to the rails 7 and 8 by screws 11.

Mounted on the strip 10, medially of its width and arranged in a longitudinally spaced series are contacts 12. The shanks or threaded portions of the contacts extend through the strip and have their lower ends 12' exposed for connection with the terminals 4 and 5 and other similar terminals.

Mounted on the contact strip 10, between the contacts 12 and the forward edge of said strip are guide elements 13 which are, like said contacts, arranged in a longitudinally spaced series. As will be seen in Fig. 1, adjacent elements 13 have opposed side walls which are shaped to define troughs, said troughs being arranged obliquely and having their corresponding inner ends confronting the contacts 12.

Associated with the frame 9 is a clamping unit 14 which includes a rod 15, said rod terminating at one end in a crank 16. The rod is journaled by the side rails near their corresponding rear ends and is disposed in parallel spaced relation to the contact strip 10. Mounted on the rod 15, between the rails 7 and 8 and in parallel spaced relation to each other are spring retaining fingers 17. As shown, the fingers comprise loops of resilient wire. However, it should be understood that flat springs or the like may be employed, if desired. The fingers 17 are all arranged in the same longitudinal plane and have depending clamping studs 18, of insulating material, secured to their bight portions, The operation of the invention will now be briefly described:

A vacuum tube V to be tested is placed with its terminal leads extending through the troughs defined by the elements 13. The corresponding free ends of the leads may thus be disposed above the proper contacts 12. To insure that the leads will have good connection with the contacts, the crank 16 is swung forward for swinging the fingers 17 downwardly, when the studs 18 will clamp the leads against the contacts for establishing good contact. The crank 16 may be held down manually or, if preferred, said crank may be weighted or clamped. After the vacuum tube or condenser has been tested, the crank may be lifted and the leads withdrawn from above the contacts and through the guide troughs.

It is desired to call particular attention to the fact that the guide elements are so arranged that the leads of a vacuum tube will be guided to their proper positions above the contacts. This arrangement permits quick and efficient testing of a vacuum tube.

It is also desired to direct attention to the fact that various modifications may be made in the construction without departing from the spirit of the invention or from the scope of the claims prepared in the light of the formal specification.

For example, flat strips of metal may be substituted for the contacts shown. Also, a strip of insulating material having V-shaped notches may be substituted for the guide elements 13.

It is thought that the construction and operation of the invention will now be understood.

What is claimed is:

1. Apparatus for testing devices having flexible conductors as terminals, comprising a plurality of relatively fixed contacts electrically insulated from one another, a plurality of relatively fixed guides each adjacent a corresponding contact for guiding a corresponding flexible conductor to the said contact, a plurality of engaging means pivotally mounted to move together about a common axis, a device for turning all the said means about the said common axis to cause them to engage the said conductors and move them along the respective guides and into electrical connection with the cooperating fixed contacts, and means for clamping the conductors at will in such connected condition and maintaining the contacts electrically insulated from one another while in the said connected condition, except for such connections as are provided by the said conductors.

2. A tester as defined in claim 1, wherein the guides are made of insulating material and each has a V-shaped opening converging toward the corresponding contact.

3. A tester as defined in claim 1, wherein the guides are made of insulating material and each has a V-shaped opening converging toward the corresponding contact, and wherein the clamping means includes an individual resiliently mounted insulated stud for each contact, the said studs engaging the conductors.

4. A tester as defined in claim 1, wherein the guides are made of insulating material and each has a V-shaped opening converging toward the corresponding contact, and wherein the clamping means includes an individual resiliently mounted insulated stud for each contact, the said studs engaging the conductors, and an operating handle for actuating the turning device.

5. A tester for apparatus having flexible conductors as terminals, comprising a plurality of relatively fixed contacts electrically insulated from one another, means adjacent each contact for guiding a corresponding flebible conductor to the said contact, a plurality of clamping means pivotally mounted to move together about a common axis, and a device for turning the said clamping means about their common axis to force the said conductors along the respective guides and into electrical connection with the cooperating fixed contacts, and for clamping the conductors at will in such connected condition and maintaining the contacts electrically insulated from one another while in the said connected condition.

EDWIN R. SANDERS.

REFERENCES CITED

The following references are of record in the file of this patent:

UNITED STATES PATENTS

| Number | Name | Date |
|---|---|---|
| 1,949,973 | Nelson | Mar. 6, 1934 |
| 2,295,367 | Sulzer | Sept. 8, 1942 |